United States Patent [19]

Seckendorf

[11] 4,081,806
[45] Mar. 28, 1978

[54] CAMERA

[76] Inventor: Bernard A. Seckendorf, 144-23 77th Ave., Flushing, N.Y.

[21] Appl. No.: 712,484

[22] Filed: Aug. 9, 1976

[51] Int. Cl.² ............. G03B 19/02; G03B 17/26; G03B 9/10
[52] U.S. Cl. .................. 354/121; 354/250; 354/288
[58] Field of Search ........... 354/250, 266, 268, 288, 354/75, 76, 82, 121, 100

[56] References Cited

U.S. PATENT DOCUMENTS

| 769,319 | 9/1904 | Niell | 354/288 |
|---|---|---|---|
| 1,430,478 | 9/1922 | Wallace | 354/288 |
| 2,521,743 | 9/1950 | Perlin | 354/120 |
| 2,625,087 | 1/1953 | Steineck | 354/121 |
| 3,910,687 | 10/1975 | Iwata | 354/226 |

FOREIGN PATENT DOCUMENTS

| 2,152,779 | 1972 | Germany | 354/266 |
|---|---|---|---|
| 403,091 | 1943 | Italy | 354/250 |
| 222,819 | 1942 | Switzerland | 354/76 |
| 314,938 | 1956 | Switzerland | 354/76 |

*Primary Examiner*—Edna M. O'Connor
*Attorney, Agent, or Firm*—C. Bruce Hamburg

[57] ABSTRACT

A photographic film cassette comprises a cylindrical container having a circular bottom, a circular piece of photographic film supported in the cassette substantially parallel to the bottom of the cassette and means fixed to the cassette and adapted to be engaged by means for rotating the cassette for successive exposure of sectors of the film therein. Also, for a camera, there is provided the combination of a shutter and a shutter actuating means, the shutter comprising a single member at least a portion of which is a first permanent magnet and the shutter actuating means comprises a second permanent magnet. The shutter is actuated by the shutter actuating means by magnetic repulsion. The cassette and shutter mechanism, while not limited to such use, lend themselves particularly well to use in a wrist camera. The wrist camera comprises a casing of diameter substantially no greater than the diameter of the wearer's wrist, a wrist band for snugly securing the casing to the wrist, the aforementioned cassette, means for rotating the cassette from outside the casing, a lens in a wall of the casing and the aforementioned shutter mechanism.

17 Claims, 8 Drawing Figures

CAMERA

BACKGROUND OF THE INVENTION

This invention relates to cameras. More particularly, this invention relates to a novel shutter mechanism, a novel film cassette and a wrist camera incorporating the shutter mechanism and the film cassette.

The camera art has reached a high level of sophistication. Consequently, many cameras are expensive, relatively fragile and expensive to repair. Shutter mechanisms, among other parts of these sophisticated cameras, suffer these disadvantages. Film cassettes are available for some of these cameras but are not as simple and compact as might be desired. For one thing, these film cassettes must incorporate storage and take-up spools for a roll of film. Moreover, despite all the sophistication in the camera art, a simple, inexpensive wrist camera has not heretofore been provided.

The objects of the present invention include the providing of a shutter mechanism, a film cassette and a wrist camera which overcome the aforementioned shortcomings of the prior art.

Other objects and advantages of the invention will be apparent from the following description of the invention.

SUMMARY OF THE INVENTION

According to one aspect of the invention, there is provided a photographic film cassette comprising a cylindrical container having a circular bottom, a circular piece of photographic film supported in the cassette substantially parallel to the bottom of the cassette and means fixed to the cassette and adapted to be engaged by means for rotating the cassette for successive exposure of sectors of the film therein. The means fixed to the cassette may comprise a gear fixed to the bottom of the cassette. The cassette may further comprise a first circular cover for the cassette, an aperture formed through the first cover, the axis of the aperture being spaced a predetermined distance from the axis of the container, a second circular cover, means mounting the second cover for rotation relative to the first cover and both covers for rotation of the container relative to both covers, an aperture formed through the second cover, the axis of the aperture being spaced from the axis of the cassette by the aforementioned predetermined distance, whereby the apertures in the covers can selectively be brought into or out of mutual alignment. The cassette may further comprise means for holding the apertures of the covers in mutual alignment when the container is rotated in one direction and for holding the apertures of the covers out of mutual alignment when the container is rotated in the opposite direction.

According to another aspect to the invention, there is provided in a camera, the combination of a shutter and a shutter actuating means, the shutter comprising a single member at least a portion of which is a first permanent magnet and the shutter actuating means comprising a second permanent magnet. Means may be provided pivotally mounting the shutter with one pole of the magnet defining one extremity of the aforementioned member. There may also be provided means for holding the second magnet for displacement of the second magnet from a position remote from the first magnet to a position in which the axis of the second magnet has moved past the axis of the first magnet with the magnetic fields of like poles of the magnets interacting at both positions whereby the shutter is held in place by magnetic repulsion, then actuated by magnetic repulsion when the second magnet is displaced so that its axis passes that of the first magnet and then again held in place by magnetic repulsion.

According to yet another aspect of the invention, there is provided a wrist camera comprising a casing of diameter substantially no greater than the diameter of the wearer's wrist, a wrist band for snugly securing the casing to the wrist, means for holding a disc of photographic film in the casing, means for rotating the holder from outside the casing, a lens mounted in a wall of the casing, a shutter for admitting the passage of light from the lens to the disc when open and blocking the passage of light from the lens to the disc when closed, the axis of the lens being substantially parallel to and being spaced from the axis of rotation of the holding means and intersecting the holding means, whereby successive sectors of a disc of photographic film carried by the holding means can be exposed by alternately actuating the shutter to expose a sector of the disc and rotating the holder to bring another sector of the disc into intersecting relationship with the axis of the lens. The "holding means" herein may be the aforementioned cassette. When the cassette has a gear fixed on the bottom thereof, the camera may further include a slot formed through the wall of the casing and a gear rotatably mounted in the slot with part of that gear extending into the casing and meshing with the gear fixed to the bottom of the cassette and part of the gear mounted in the slot projecting from the casing, whereby the gear mounted in the slot can be manually rotated from outside the casing thereby to rotate the cassette. The wrist camera may also comprise means for holding the apertures of the covers of the cassette in alignment with the lens when the container is rotated in one direction and for holding the apertures of the covers out of alignment with each other when the cassette is rotated in the opposite direction.

The aforementioned shutter mechanism may be incorporated in the wrist camera. In that regard, it will be recalled that the shutter comprises a single member, at least a portion of the member being a permanent magnet. The wrist camera may further comprise means pivotally mounting the shutter with one pole of the magnet adjacent the periphery of the casing and the other pole remote from the periphery of the casing. The magnetic means for actuating the shutter comprises, it will be recalled, a permanent magnet. The camera may further comprise means for holding the shutter actuating magnet in an orientation with one of its poles adjacent the periphery of the casing and the other of its poles remote from the periphery of the casing and for permitting the shutter actuating magnet to be displaced from a position remote from the shutter magnet to a position in which the axis of the shutter actuating magnet has moved past the axis of the shutter magnet, the pole of the shutter actuating magnet adjacent the periphery of the casing and the pole of the shutter magnet adjacent the periphery of the casing being like poles whereby the shutter is actuated by magnetic repulsion when the shutter actuating magnet is displaced so that its axis passes that of the shutter magnet.

It can readily be appreciated that the cassette and the shutter mechanism of the invention can be incorporated in cameras other than wrist cameras. Nevertheless, the simplicity and compactness of the cassette and the shutter mechanism are particularly well suited to such a compact camera as a wrist camera.

DETAILED DESCRIPTION OF THE INVENTION

The invention will now be further described by reference to a specific embodiment thereof as illustrated in the drawings, in which.

Figures 1, 2:
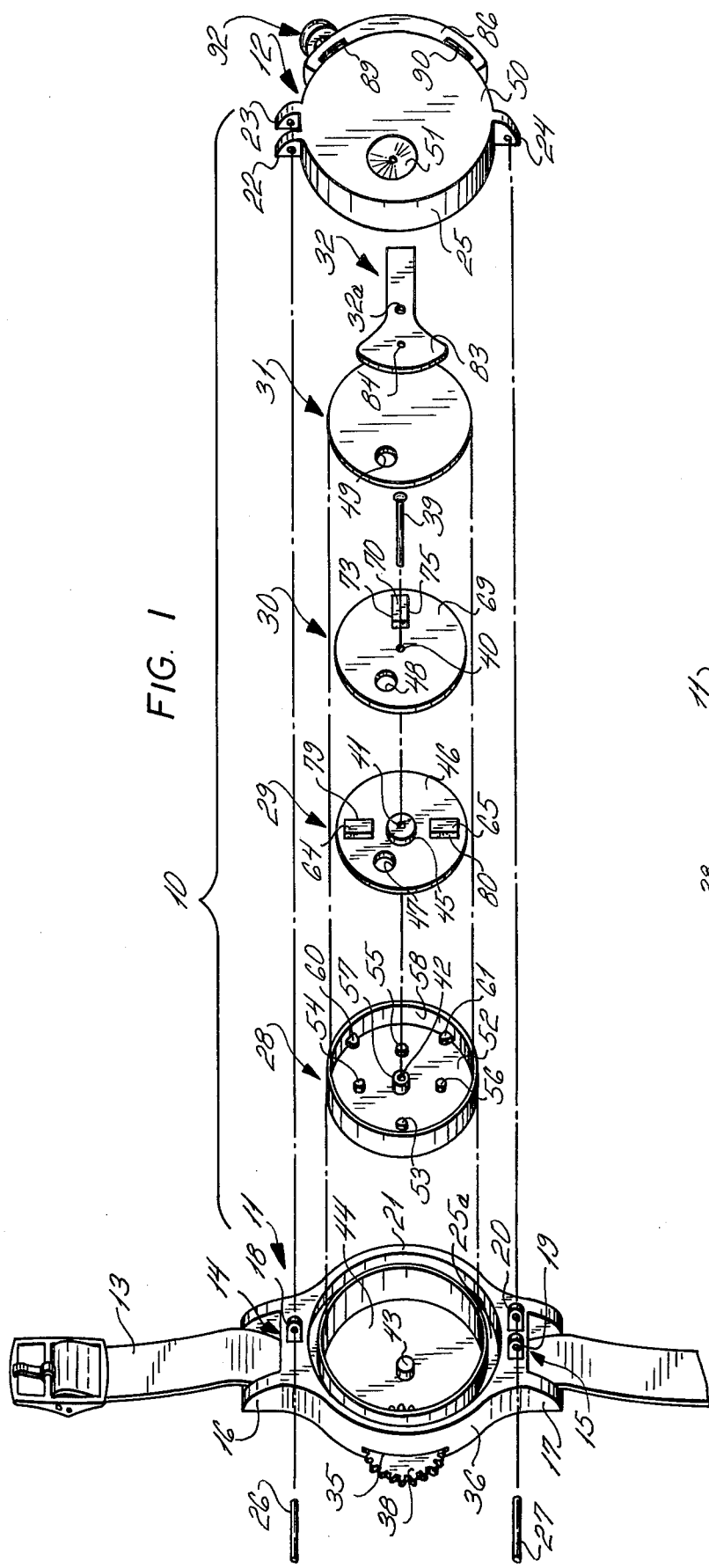
FIG. 1 is an exploded isometric view of a wrist camera according to the invention.
FIG. 2 is an isometric view, partly broken away, of the cassette having a gear fixed to the back thereof in combination with a gear in the casing for rotating the cassette.

With reference to FIG. 1, it is seen that the wrist camera 10 of the invention consists of a casing base 11 and a casing cover 12. A wrist strap 13 is received through slots 14 and 15 in ears 16 and 17 formed on the casing base 11. Between the slots 14 and 15, the wrist strap 13 passes behind the casing base 11. For convenient, comfortable wearing, the dimension of the casing from one lateral extremity to another in the direction of wrist strap 13 is generally less than the diameter of the wearer's wrist. Lugs 18, 19 and 20 are formed on the rim 21 of the casing base 11. Lugs 22, 23 and 24 are formed on the cylindrical side wall 25 of the casing cover 12. The lower edge of the cylindrical side wall 25 is received in an annular groove 25a formed in the rim 21 of the casing base 11, thereby providing a light seal. A pin 26 passes with a snug fit sequentially through lugs 22, 18 and 23 and a pin 27 passes with a snug fit sequentially through lugs 19, 24 and 20, thereby to secure the casing cover 12 onto the casing base 11.

Contained in the casing base 11 are a cassette container 28, a cassette lower cover 29 and a cassette upper cover 30. A disc shaped member 31 is fixed in the casing cover 12.

A gear 33 is formed on the back of the bottom 34 of the cassette 28 (FIG. 2). A blind axial bore 103 is formed in the gear 33. A slot 35 is provided through a side wall 36 of the casing base 11 (FIG. 1). Rotatably mounted therein by means of a pin 37 is a gear 38 which meshes with a gear 33. It is seen that the gear 38 extends partially within and partially without the casing base 11.

The cassette consists of the container 28 in combination with the lower cover 29 and the upper cover 30. These three elements are mounted for relative rotation by means of a pin 39. The pin is slidably received in an axial hole 40 through the upper cover 30 and in an axial hole 41 through the lower cover 29. The pin 39 is, finally, tightly received in a blind axial hole 42 in the container 28. A cylindrical boss 43 is formed axially on the interior bottom wall 44 of the casing base 11 and is received in the bore 103 to serve as a stub axle upon which the container 28 is rotatable. A cylindrical boss 45, through which is formed a hole 41, is provided on the upper face 46 of the lower cover 29 to serve as a bearing for relative rotation between the lower cover 29 and the upper cover 30.

Apertures 47, 48 and 49 are formed through respective elements 29, 30 and 31. It can be readily seen that the entire assembly has a common axis. Each of the apertures 47, 48 and 49 is spaced from that axis by the same distance. Through the face 50 of the casing cover 12 is provided a conventional camera lens 51. The axis of this lens is spaced the same distance from the aforementioned common axis as are the apertures 47, 48 and 49. Thus, the three apertures 47, 48 and 49 and the lens 51 can be aligned.

Figure 3:
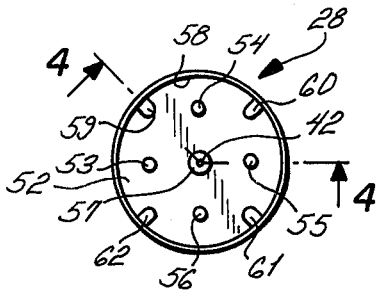
FIG. 3 is a plan view of the container portion of the cassette, showing the interior of the bottom of the cassette.
Figure 4:
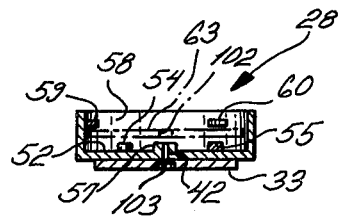
FIG. 4 is a section taken on section line 4—4 of FIG. 3.

Formed on the interior bottom wall 52 of the container 28 are five cylindrical bosses 53, 54, 55, 56 and 57 (FIGS. 1 and 3). The boss 57 is axially located and has the blind hole 42 formed therein and the bosses 53, 54, 55 and 56 are equidistantly spaced thereabout. Formed on the interior cylindrical wall 58 of the container 28, equidistantly spaced and radially interposed between the bosses 53, 54, 55 and 56, are lugs 59, 60, 61 and 62 (FIg. 3). A disc of photographic film 63 (shown in FIG. 4 but not shown in FIG. 1) is supported above and parallel to the interior bottom wall 52 of the container 28 by resting on the bosses 53, 54, 55, 56 and 57. From above, the disc 63 is held in place by the lugs 59, 60, 61 and 62. In this respect, it will be appreciated that the distance between the plane in which the bottoms of the lugs 59, 60, 61 and 62 lie and the plane in which the tops of the bosses 53, 54, 55, 56 and 57 lie is slightly greater than the thickness of the disc 63. An aperture 102 is formed through the center of the disc 63. The aperture permits passage of the pin 39 and also serves another function, which is described hereinafter.

Figure 7:
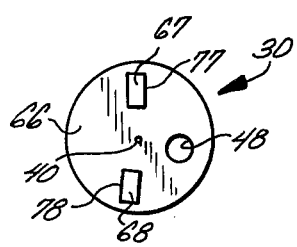
FIG. 7 is a plan view of the underside of the upper cover of the cassette.
Figure 8:
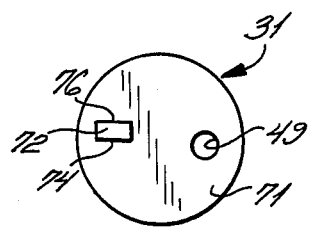
FIG. 8 is a plan view of the underside of the member interposed between the cassette and the shutter mechanism.

On the upper face 46 of the lower cover 29 are formed a pair of diametrically opposed like protrusions 64 and 65 (FIG. 1). Similarly, on the lower face 66 of the upper cover 30 are formed a pair of diametrically opposed like protrusions 67 and 68 (FIG. 7). On the upper face 69 of the upper cover 30 is formed a single like protrusion 70 (FIG. 1). Finally, on the lower face 71 of the disc shaped member 31 is formed yet another like protrusion 72 (FIG. 8). Each of the protrusions 64, 65, 67, 68, 70 and 72 is oriented substantially radially and is located substantially the same distance from the common axis of the cassette and the camera casing as the other protrusions.

The disc shaped member 31 is fixed in the casing cover 12 with the axis of the aperture 49 therein in alignment with the axis of the lens 51. Only when the side 73 of the protrusion 70 abuts against the side 74 of the protrusion 72, are the apertures 48 and 49 in axial alignment. At other rotational orientations of the upper cover 30 relative to the disc shaped member 31, including when the side 75 of the protrusion 70 is abutting against the side 76 of the protrusion 72, the apertures 48 and 49 are out of alignment. Only when the side 77 of the protrusion 67 and the side 78 of the protrusion 68 abut respectively against the side 79 of the protrusion 64 and the side 80 of the protrusion 65, are the apertures 47 and 48 in axial alignment. At the same time, if the side 73 of the protrusion 70 is abutting against the side 74 of the protrusion 72, the apertures 47 and 48 are in axial alignment with the aperture 49.

Figure 5:
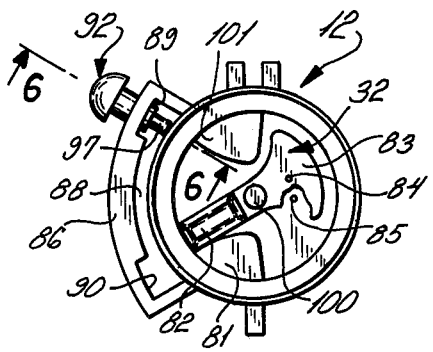
FIG. 5 is a plan view of the open cover of the casing, showing the shutter mechanism.

The shutter 32 consists of an integral member pivotally mounted in the casing cover 12 by means of a pin 100 which passes through an aperture 32a provided in the shutter 32 (FIG. 5). Stopping members 101 and 81 are integrally formed in the casing 12 to limit the pivotal movement of the shutter 32. One portion of the shutter 32 is a permanent magnet 82 radially oriented with one of its poles adjacent the pivot pin 100 and the other of its poles adjacent the periphery of the casing cover 12. The other portion of the shutter 32 is a shutter leaf 83 having an aperture 84 formed therein. For illustrative purposes, in FIG. 5 part of the leaf 83 has been broken away to show the aperture 85 in the casing cover 12 for the lens 51. The apertures 84 and 85 are equidistantly spaced from the axis of the pin 100 so that the apertures are alignable.

Figure 6:
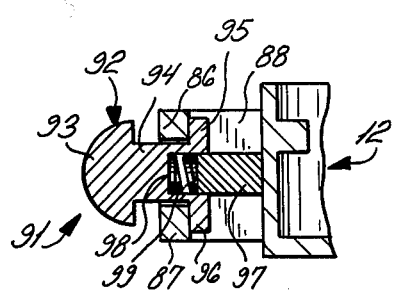
FIG. 6 is a section taken on section line 6—6 of FIG. 5.

Arcuate members 86 and 87, in which there is formed a track 88, are fixed to the periphery of the casing cover 12 (FIGS. 5 and 6). At the ends of the outer periphery of the track 88 are formed notches 89 and 90. A shutter actuating assembly 91 is mounted for reciprocating along the track 88. The assembly 91 consists of a pin 92 formed with a head 93 and a shank 94, shoulders 95, 96 formed on the shank 94, a cylindrical permanent magnet 97 axially extending from the shank 94 and being slidably received in the blind bore 98 in the shank 94. A helical spring 99 is received in the bore 98 with one end thereof abutting against the base of the bore 98 and the other end thereof abutting against the end of the magnet 97 received in the bore 98, whereby the magnet 97 is biased against the outer periphery of the casing cover 12. The shoulders 95 and 96 are dimensioned to be received in the notches 89 and 90.

Operation of the wrist camera, film cassette and shutter mechanism of the invention will hereinafter be described.

A cassette according to the invention is assembled in darkroom facilities and leaves the darkroom facilities with the apertures 47 and 48 out of alignment so that the film 63 in the cassette is not exposed. The casing cover 12 is removed by pushing out the pins 26 and 27. The cassette is then inserted into the base 11 with the boss 43 received in the bore 103 in the gear 33 and the teeth of the gear 38 engaging the teeth of the gear 33. The cover 12 is then fastened back in place by means of reinsertion of the pins 26 and 27. The gear 38 is then rotated clockwise (as viewed in FIG. 1) with ones thumb. The clockwise rotation of the gear 38 results in counterclockwise rotation of the cassette container 28 by virtue of engagement of the gear 38 with the gear 33. Frictional engagement of the lower cover 29 with the edge of the container 28 results in the cover 29 being carried in a counterclockwise direction along with the container 28. With the aforementioned abutting relationships between the various protrusions formed on the covers 29 and 30 and the disc shaped member 31 have been brought about due to the aforementioned counterclockwise rotation, the apertures 47, 48 and 49 are in axial alignment as hereinabove described. To "snap" a picture, the wrist camera is aimed at the subject, the assembly 91 is depressed to release the shoulders 95 and 96 from the notch 89, and the assembly 91 is slid along the track 88 until the shoulders 95 and 96 snap into the notch 90. The permanent magnet 97 has been arranged with one of its poles adjacent the periphery of the casing cover 12 and the other of its poles received in the bore 98, the pole adjacent the periphery of the casing cover 12 being a pole like the pole of the magnet 82 adjacent the periphery of the casing cover 12, that is, both are North or both are South. Each of the magnets 82 and 97 has an imaginary axis connecting the centers of the poles of the magnet which are at the ends of the magnet. Hence, when the assembly 91 is slid from the notch 89 to the notch 90, as the axis of the magnet 97 passes the axis of the magnet 82, magnetic repulsion snaps the magnet 82 in the clockwise direction as viewed in FIG. 5 until the magnet 82 comes to rest against the stop 101, magnetic repulsion holding the magnet 82 in that position. Of course, at the same time, the leaf 83 is also rotating in the clockwise direction (as viewed in FIG. 5). Hence, the aperture 84 in the leaf 83 passes momentarily into alignment with the aperture 85 containing the lens 51 and an exposure is therefore made. When the assembly 91 is held in place at notch 89 or at notch 90, magnetic repulsion holds the shutter 32 stationary against stopping member 81 or stopping member 101, respectively. Hence, the cooperation between the assembly 91 and the notches 89 and 90 prevents accidental actuation of the shutter 32. The user then rotates the gear 38 again in the clockwise direction as viewed in FIG. 1. The covers 29 and 30 of the cassette are held in place by the counterclockwise torque thus applied, due to the above described abutment of the various protrusions on the upper and lower covers 29 and 30 and the disc shaped member 31 while the container portion 28 of the cassette rotates to bring a subsequent sector of the disc of film 63 into alignment with the apertures 47, 48 and 49. Then, the assembly 91 is moved back to its original position, resulting in another actuation of the shutter by magnetic repulsion. The aforementioned operations are repeated until all of the sectors on the disc of film 63 have been exposed. At this point, the user rotates the gear 38 in the counterclockwise direction as viewed in FIG. 1. Frictional contact between the periphery of the container portion 28 of the cassette and the lower cover 29 threof causes the lower cover 29 to rotate in the clockwise direction with the container 28, thereby carrying the aperture 47 out of alignment with the aperture 48. Then, the cover 12 can be removed from the base 11 by removing the pins 26 and 27 and the cassette can be removed from the camera without further exposure of the film. The cassette can then be developed without the benefit of darkroom facilities. When the cassette is immersed in a developing fluid, the developing fluid may enter the cassette by passing through the aperture 48 in the upper cover 30 and then through the aperture 47 in the lower cover 29 into the container 28. The developing fluid then contacts the photographic emulsion on the top side of the film disc 63. Also, because the film disc 63 is provided with an aperture 102 and is held above the bottom wall 52 of the container 28 by the bosses 53 to 57 inclusive, and the lugs 59 to 62, inclusive, the developing fluid will also pass through the aperture 102 and circulate under the film disc 63.

While the invention has been particularly described with reference to certain specific embodiments thereof, it is to be understood that these embodiments are intended to illustrate rather than to limit the invention. For example, while a camera of the invention has been illustrated without a view finder, it is apparent that any conventional view finder may be incorporated. Also, the gear 38 may be provided with indicia to assist the user in locating successive sectors of a disc of film for exposure. Furthermore, any of various conventional means may be incorporated to vary the aperture opening to adjust the exposure to varying light conditions and different types of film. Moreover, the camera may be combined with a watch, the lens being mounted in the face of the watch. Other modifications and variations will be obvious to those skilled in the art and it is intended that such modifications and variations be included within the scope of the invention as defined by the appended claims.

What is claimed is:

1. A wrist camera comprising a casing of diameter substantially no greater than the diameter of the wearer's wrist and having a cylindrical interior defined by a cylindrical side wall and circular end walls, a wrist band for snugly securing the casing to the wrist, a cylindrical chamber formed in the casing, a cylindrical photographic film cassette received in the chamber coaxially with the chamber, a disc of photographic film coaxially received in the cassette and having an aperture at the center thereof, means for rotating the cassette about its axis from outside the casing, a lens mounted in an end wall of the casing, a shutter for admitting the passage of light from the lens to the film disc when open and blocking the passage of light from the lens to the film disc when closed, the axis of the lens being substantially parallel to and spaced from the axis of rotation of the film cassette and intersecting the film disc, whereby successive sectors of the film disc can be exposed by alternately actuating the shutter to expose a sector of the film disc and rotating the cassette to bring another sector of the film disc into intersecting relationship with the axis of the lens, the film cassette comprising a cylindrical container having a circular bottom, means fixed to the container and adapted to be engaged by said rotating means for rotating the container, a first circular cover for the cassette, the first cover being in insufficient frictional engagement with the container that it rotates with the container, a second circular cover overlying the first cover, respective apertures formed through the first and second covers, means mounting the second cover for rotation relative to and coaxially with the first cover, the axis of each of the apertures being spaced from the axis of rotation of the film cassette the same distance as the spacing of the lens axis from said axis of rotation, means for maintaining the covers in axially spaced relation from each other whereby there is not such frictional engagement between the two covers as to cause the second cover to rotate with the first cover, means for holding the film disc in spaced relation from the first cover and from the bottom of the cassette, whereby the film is developable in the cassette with the apertures in the covers out of registry and without the benefit of darkroom facilities, the film disc in the cassette then being inaccessible to light but fully accessible to developing liquid.

2. A wrist camera according to claim 1, in which said means fixed to the cassette comprises a first gear fixed to the underside of the container bottom, a slot is formed through the side wall of the casing and the means for rotating the cassette comprises a second gear rotatably mounted in the slot with part of the second gear extending into the casing and meshing with the first gear and part of the second gear projectng from the casing, whereby the second gear can be manually rotated from outside the casing thereby to rotate the container.

3. A wrist camera according to claim 2, further comprising means for holding the apertures of the covers in mutual alignment when the container is rotated in one direction and for holding the apertures of the covers out of alignment with each other when the container is rotated in the opposite direction.

4. A wrist camera according to claim 3, in which the means for holding the apertures of the covers in alignment with each other when the container is rotated in one direction and for holding the apertures of the covers out of alignment with each other when the covers are rotated in the opposite direction comprises on the face of each of the covers facing the other cover a pair of diametrically opposed protrusions.

5. A wrist camera according to claim 4, in which said shutter is housed in said casing adjacent to said wall in which said lens is mounted and the camera further comprises a disc shaped member rotationally fixedly mounted in the casing to form together with the casing wall in which the lens is mounted and the side walls of the casing a cylindrical compartment enclosing the shutter and separating the shutter from the cassette, an aperture in the disc shaped member having an axis coincident with the axis of the lens and means for holding the apertures of the covers in alignment also with the aperture of the disc when the container is rotated in said one direction.

6. A wrist camera according to claim 5, in which said means for holding the apertures of the covers in alignment with the aperture of the disc when the container is rotated in said one direction comprises on each of the face of the second cover and the face of the disc shaped member facing each other a respective protrusion.

7. A wrist camera according to claim 1, in which the shutter comprises a single member, at least a portion of the member being a permanent magnet.

8. A wrist camera according to claim 7, further comprising means pivotally mounting the shutter with one pole of the magnet adjacent the periphery of the casing and the other pole remote from the periphery of the casing.

9. A wrist camera according to claim 8, further comprising magnetic means for actuating the shutter.

10. A wrist camera according to claim 9, in which the magnetic means for actuating the shutter comprises a permanent magnet and means for holding the shutter actuating magnet in an orientation with one of its poles adjacent the periphery of the casing and the other of its poles remote from the periphery of the casing and for permitting the shutter actuating magnet to be displaced from a position remote from the shutter magnet to a position adjacent the shutter magnet, the pole of the shutter actuating magnet adjacent the periphery of the casing and the pole of the shutter magnet adjacent the periphery of the casing being like poles whereby the shutter is actuated by magnetic repulsion when the shutter actuating magnet is displaced toward the shutter magnet.

11. A wrist camera according to claim 10, in which the means for permitting the shutter actuating magnet to be displaced comprises means for guiding the shutter actuating magnet along an arcuate path concentric with the casing and limited to substantially less than a semicircle, the shutter actuating magnet being in a rest position at either lmit of its path and being radially oriented, the pivotal mounting of the shutter is concentric with the casing, the shutter magnet being radially oriented, the camera further comprises stop means limiting the pivoting of the shutter to an arcuate path of the shutter magnet of lesser sweep than the limits of the arcuate path of the shutter actuating magnet, the strengths of the magnetic fields of the magnets are selected and the stop means are positioned relative to the limits of the shutter actuating magnet arcuate path so that the shutter is held in alternate rest positions against the respective stops by the mutual repellence of the magnetic fields of the like poles of the magnets, the stop against which the shutter rests at any particular time being that which is more remote from the limit of the arcuate path of the shutter actuating magnet at which the shutter actuating magnet is positioned, and so that when the shutter actuating magnet is moved from one of its rest positions to the other, the axis of the shutter actuating magnet passes the axis of the shutter magnet, whereupon the shutter magnet is sharply repelled until the shutter comes to rest against the other stop.

12. A film cassette comprising a cylindrical container having a circular bottom, means fixed to the cassette and adapted to be engaged by means for rotating the cassette about its axis, a first circular cover for the cassette, a second circular cover overlying the first cover, respective apertures formed through the first and second covers, means mounting the second cover for rotation relative to and coaxially with the first cover, the axis of each of the apertures being spaced from the axis of rotation of the film cassette the same distance, means for maintaining the covers in axially spaced relation from each other, a disc of photographic film having an aperture in the center thereof, means for holding the film disc in spaced relation from the first cover and from the bottom of the cassette, whereby the film is developable in the cassette with the apertures in the covers out of registry and without the benefit of darkroom facilities, the film disc in the cassette than being inaccessible to light but fully accessible to developing liquid.

13. A cassette according to claim 12, in which the means fixed to the cassette comprises a gear fixed to the bottom of the cassette.

14. A cassette according to claim 13, further comprising means for holding the apertures of the covers in mutual alignment when the container is rotated in one direction and for holding the apertures of the covers out of mutual alignment when the container is rotated in the opposite direction.

15. A cassette according to claim 14, in which the means for holding the apertures of the covers in alignment with each other when the container is rotated in one direction and for holding the apertures of the covers out of alignment with each other when the covers are rotated in the opposite direction comprises on the face of each of the covers facing the other cover a pair of diametrically opposed protrusions.

16. In a camera, the combination of a shutter and shutter actuating means, the shutter comprising a single member, at least a portion of said member being a permanent magnet, a cylindrical compartment containing the shutter, means mounting the shutter for pivoting about the axis of the compartment, the shutter magnet being radially oriented with one of its poles adjacent to the interior periphery of the compartment and the other of its poles remote from the interior periphery of the compartment, the shutter actuating means comprising another permanent magnet, means for guiding the shutter actuating magnet along a substantially less than semicircular arcuate path about the axis of the compartment with the shutter actuating magnet being radially oriented with one of its poles adjacent to the exterior periphery of the compartment and the other of its poles remote from the exterior periphery of the compartment, the poles of the respective magnets adjacent to the respective interior and exterior peripheries of the compartment being like poles, stop means limiting the pivoting of the shutter to an arcuate path of the shutter actuating magnet, the strengths of the magnetic fields of the magnets being selected and the stop means being positioned relative to the limits of the shutter actuating magnet arcuate path so that the shutter is held in alternate rest positions against the respective stops by the mutual repellence of the magnetic field of the like poles of the magnets, the stop against which the shutter rests at any particular time being that which is more remote from the limit of the arcuate path of the shutter actuating magnet at which the shutter actuating magnet is positioned, and so that when the shutter actuating magnet is moved from one of its rest positions to the other, the axis of the shutter actuating magnet passes the axis of the shutter magnet, whereupon the shutter is sharply repelled until the shutter comes to rest against the other stop.

17. The combination of claim 16, further comprising means for releasably securing the shutter actuating magnet at each of its rest positions, thereby to prevent unintentional actuating of the shutter.

* * * * *

UNITED STATES PATENT AND TRADEMARK OFFICE
CERTIFICATE OF CORRECTION

PATENT NO. : 4,081,806
DATED : March 28, 1978
INVENTOR(S) : Bernard A. Seckendorf It is certified that error appears in the above-identified patent and that said Letters Patent are hereby corrected as shown below:

```
Column 1, line 55, change "aspect to" to --aspect of--.
Column 3, line 57, change "a gear 33" to --the gear 33--.
Column 5, line 19, change "reciprocating" to --reciproca-
                   tion--;
          line 52, change "With" to --When--.
Column 7, line 33, change "being in insuffi-" to --being
                   in suffi- --;
          line 60, change "projectng" to --projecting--.
Column 8, line 59, change "lmit" to --limit--.
Column 9, line 30, change "than" to --then--.
Column 10, line 31, change "field" to --fields--.
```

Signed and Sealed this

Third Day of October 1978

[SEAL]

Attest:

RUTH C. MASON
*Attesting Officer*

DONALD W. BANNER
*Commissioner of Patents and Trademarks*